United States Patent
Horie et al.

(10) Patent No.: US 7,133,026 B2
(45) Date of Patent: Nov. 7, 2006

(54) INFORMATION INPUT DEVICE FOR GIVING INPUT INSTRUCTIONS TO A PROGRAM EXECUTING MACHINE

(75) Inventors: Hiromasa Horie, Tokyo (JP); Kensuke Kita, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 713 days.

(21) Appl. No.: 10/288,883

(22) Filed: Nov. 6, 2002

(65) Prior Publication Data
US 2003/0117377 A1    Jun. 26, 2003

(30) Foreign Application Priority Data
Nov. 8, 2001  (JP)   ............................ 2001-342975

(51) Int. Cl.
G06G 5/08 (2006.01)
G06F 9/00 (2006.01)
G06F 3/00 (2006.01)

(52) U.S. Cl. ...................... 345/163; 345/173; 348/734; 463/30; 463/37; 463/39; 715/701

(58) Field of Classification Search ........ 345/156–158, 345/163, 168, 173, 184; 715/17, 83, 701, 715/702, 810; 463/30, 37, 39, 46, 47; 348/734
See application file for complete search history.

(56) References Cited

U.S. PATENT DOCUMENTS

| | | | |
|---|---|---|---|
| 5,977,867 A * | 11/1999 | Blouin ..................... | 340/407.2 |
| 6,342,880 B1 * | 1/2002 | Rosenberg et al. ......... | 345/161 |
| 6,636,197 B1 * | 10/2003 | Goldenberg et al. ........ | 345/156 |
| 6,822,635 B1 * | 11/2004 | Shahoian et al. ........... | 345/156 |
| 2001/0011995 A1 * | 8/2001 | Hinckley et al. ........... | 345/156 |

* cited by examiner

*Primary Examiner*—Henry N. Tran
(74) *Attorney, Agent, or Firm*—Frommer Lawrence & Haug LLP; William S. Frommer; Thomas F. Presson (57) ABSTRACT

An information input device has a device body made of an elastically deformable material. The device body can be held in a palm and operated with one hand. The device body is provided in its face with a touchpad. A pressure sensor and an acceleration sensor are independently provided in the device body. The device body includes therein an RF module for transmitting a sensor signal from each sensor to a personal computer. By a control unit (CPU) in the device body, for example, a determination signal for determining an operation on the touchpad as input data is assigned to the pressure sensor, and a canceling signal for canceling the determination signal is assigned to the acceleration sensor. Thus, the user need not operate the device body on a desk or the like. The user can easily hold and operate the device body with one hand, without restriction of place to operate.

8 Claims, 14 Drawing Sheets

INFORMATION INPUT DEVICE FOR GIVING INPUT INSTRUCTIONS TO A PROGRAM EXECUTING MACHINE

This application is related to Japanese Patent Application No. 2001-342975 filed on Nov. 8, 2001, based on which this application claims priority under the Paris Convention and the contents of which are incorporated herein by reference.

BACKGROUND OF THE INVENTION

1. Field of the Invention

The present invention relates to information input devices used, e.g., for moving a cursor or the like displayed on a monitor screen connected with a program executing machine, such as a computer or a video game machine, that executes an application program, and for selecting, from an operation menu, a process to be executed; an information input system; and an information input method.

2. Description of the Related Art

As information input devices, mouse to be connected with computers or the like and controllers to be connected with video game machines are known for example. Touchpads and trackballs generally provided on note-type personal computers or the like are also information input devices.

Any mouse is moved on and along a flat face such as a desk. For example, a cursor is moved accordingly on a monitor screen to select an item from an operation menu displayed on the screen. The mouse can be operated to determine the selection of the item. Any touchpad or any trackball enables similar operations by being rubbed or rolled with a fingertip or the like. Any controller connected with a video game machine also enables operations such as cursor movement.

However, in case of mouse, it must be operated on a flat face such as a desk. In case of game controller, the operator must hold it in both hands to operate. This may restrict the operator's posture to operate. In case of touchpad or trackball, the operator must operate it with putting his or her hand on the body of the personal computer. This also may restrict the operator's posture to some extent.

As described above, any conventional information input device has a problem that it may restrict the operator's posture to some extent. Besides, any conventional information input device has been made functionally first of all. Therefore, it could not take a free shape and so lacked fun in design.

SUMMARY OF THE INVENTION

An object of the present invention is to provide information input devices that are free from place and posture to operate, can be held easily with one hand to operate, and can freely be designed in shape; an information input system; and an information input method.

According to the present invention, an information input device gives input instructions to a program executing machine.

The device body is provided in, e.g., its face with a sheet-like sensor for sensing a touch of an operator's finger or the like and the touched position. The device body includes therein sensor signal transmitting means for transmitting a sensor signal from the sheet-like sensor to the program executing machine.

Using the information input device of the present invention, the operator can perform input operations with holding the device body with one hand in an easy posture of the operator without restriction of place to operate.

BRIEF DESCRIPTION OF THE DRAWINGS

The above and other features will be better understood from the exemplary embodiments described below, taken together with the drawings, of which.

DETAILED DESCRIPTION OF THE PREFERRED EMBODIMENTS

Preferred embodiments of the present invention will be described below in detail with reference to relevant accompanying drawings.

Construction of Information Input Device

Figure 1:
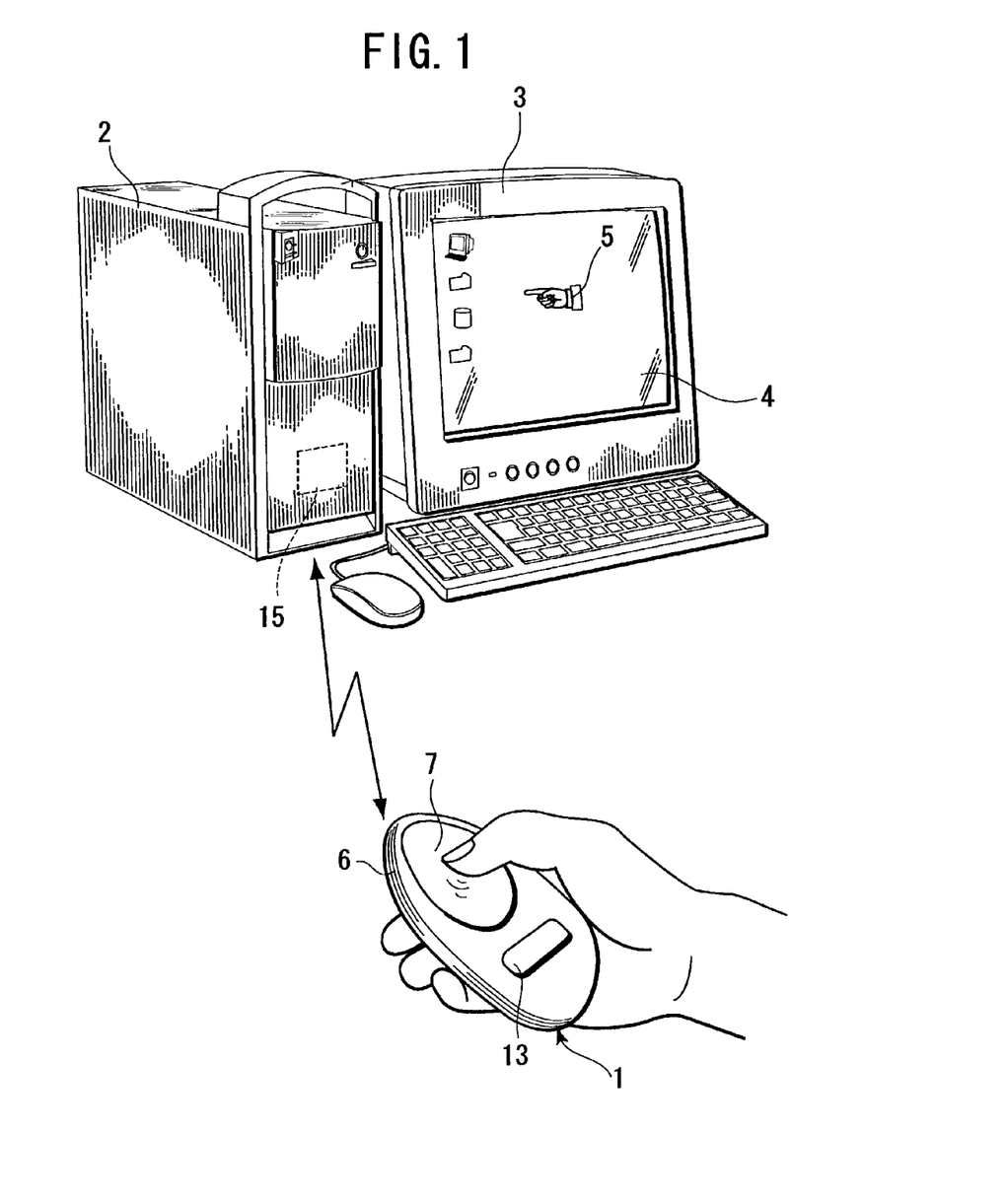
FIG. 1 is a perspective view showing an example in which a cursor being displayed on a monitor screen connected with a personal computer is moved with an information input device according to an embodiment of the present invention.
Figure 2:
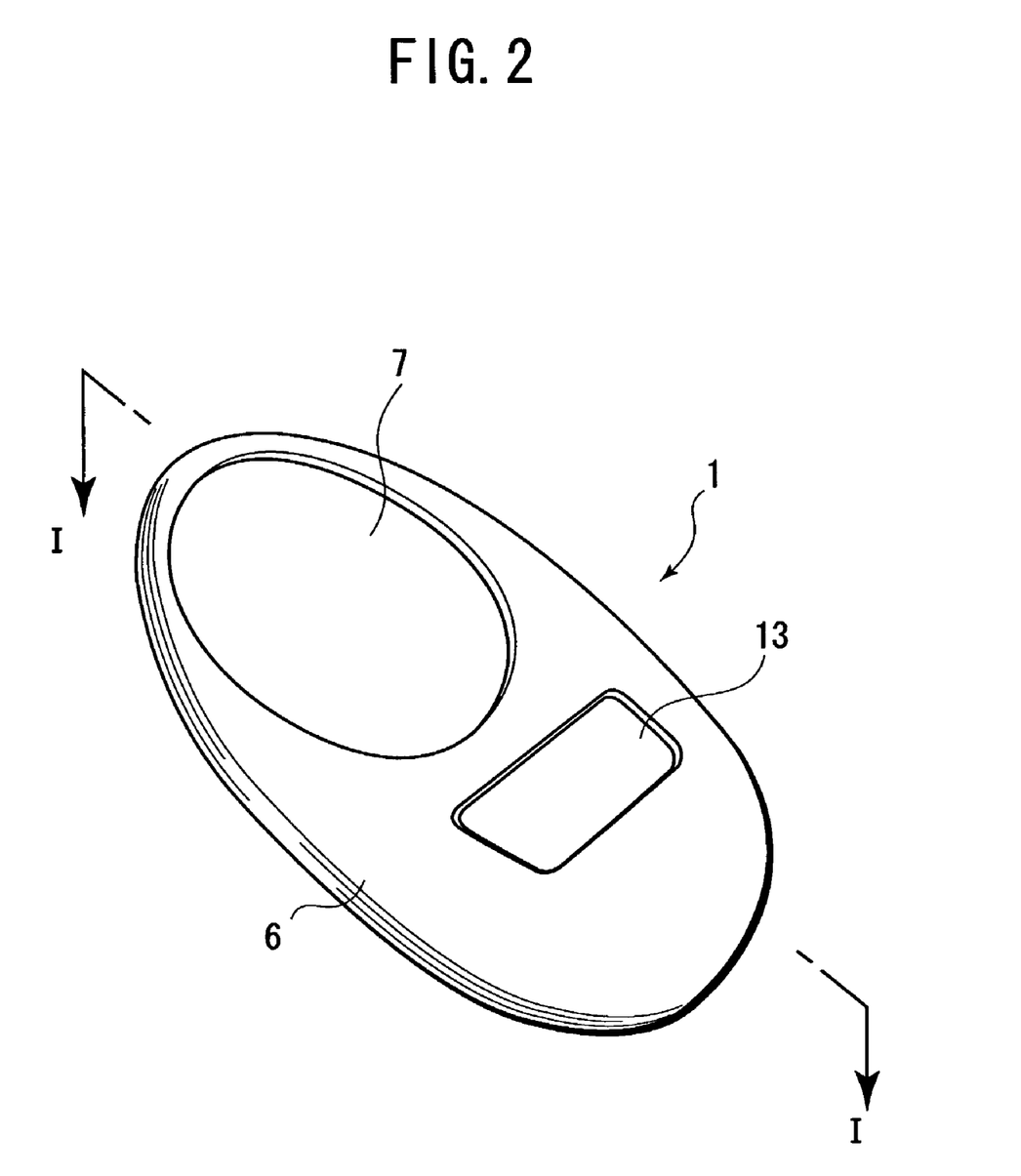
FIG. 2 is a perspective view of the information input device.
Figure 3:
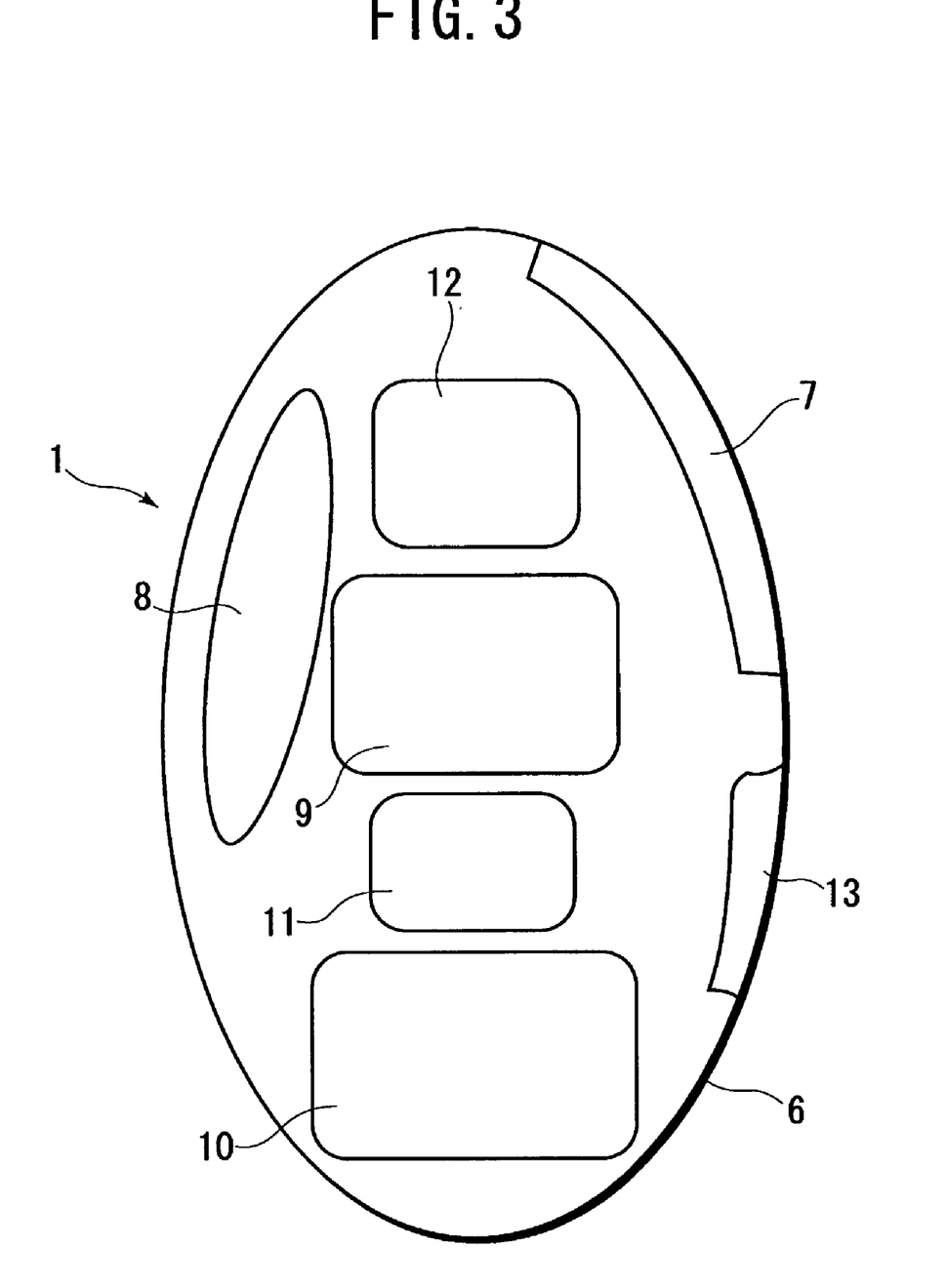
FIG. 3 is a sectional view taken along line I—I in FIG. 2, showing the arrangement of functional components provided in the device body of the information input device.
Figure 4:
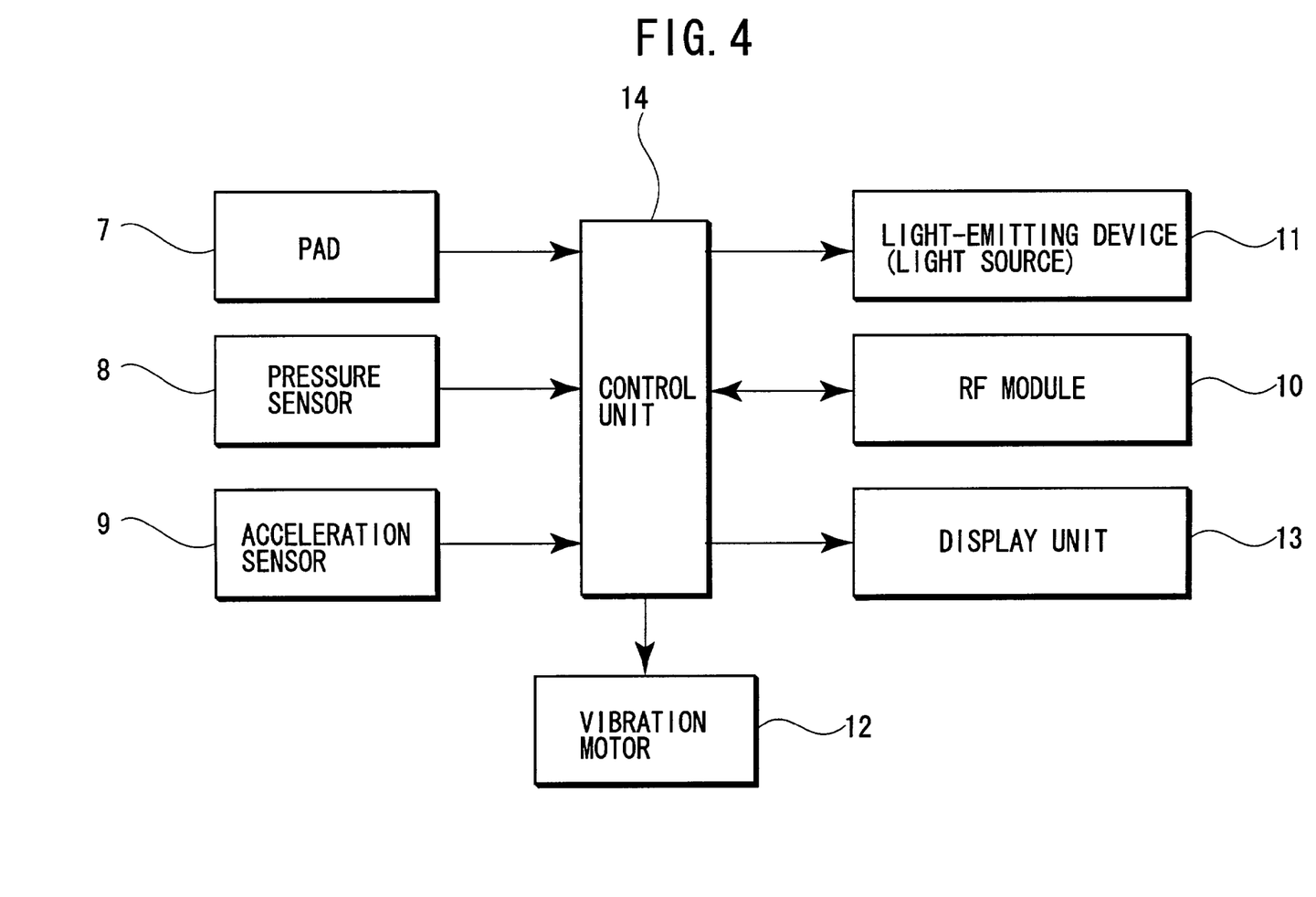
FIG. 4 is a block diagram showing a general construction of the information input device.
Figure 5:
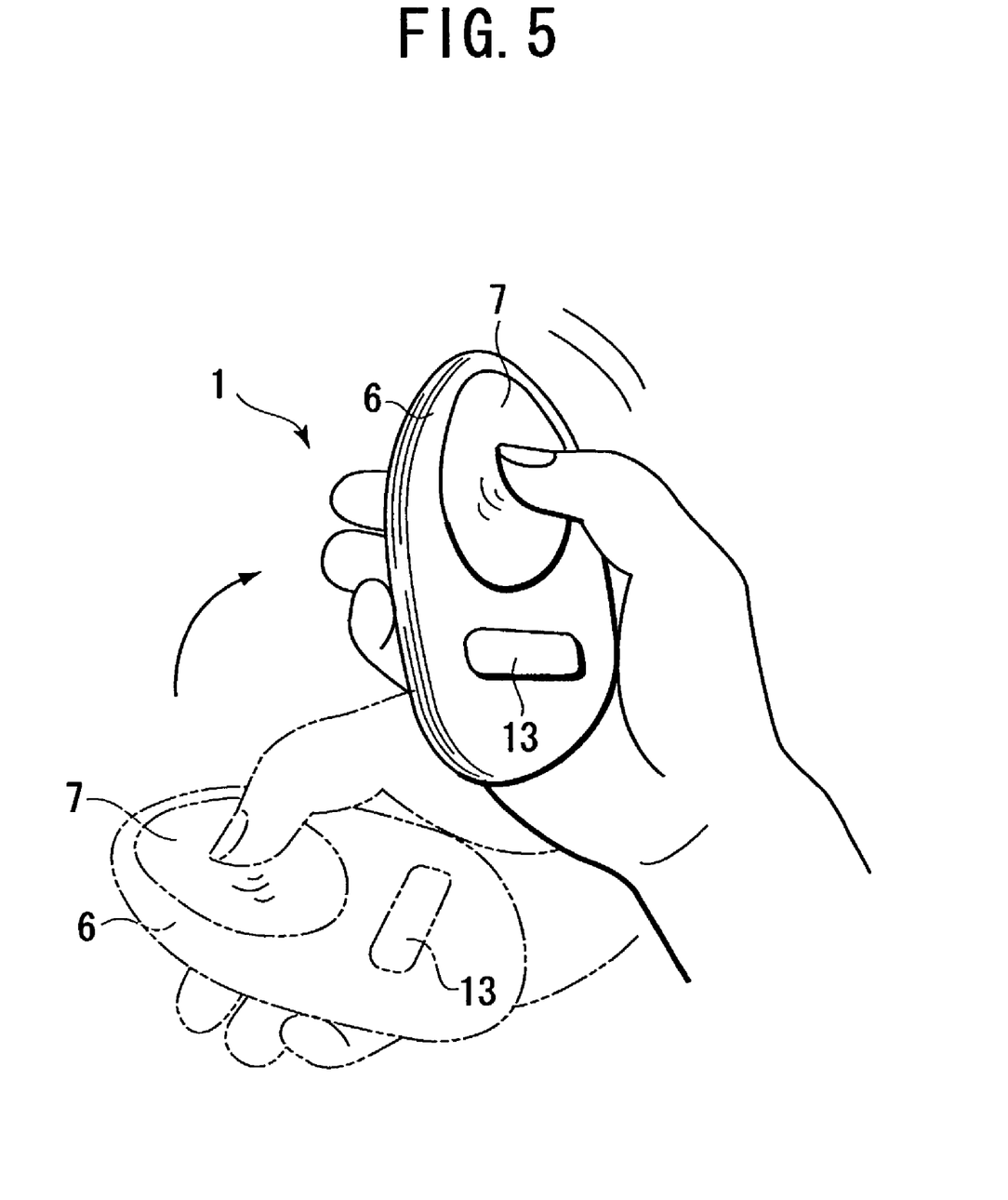
FIG. 5 illustrates an action of rapidly shaking the device body to cancel the operation contents that have been input in the information input device.

FIG. 1 is a perspective view showing an example in which a cursor being displayed on a monitor screen connected with a personal computer is moved with an information input device according to an embodiment of the present invention. FIG. 2 is a perspective view of the information input device. FIG. 3 is a sectional view taken along line I—I in FIG. 2, showing the arrangement of functional components provided in the device body of the information input device. FIG. 4 is a block diagram showing a general construction of the information input device. FIG. 5 illustrates an action of rapidly shaking the device body to cancel the operation contents that have been input in the information input device.

As illustrated in FIG. 1, the information input device 1 of this embodiment is used to, e.g., move a cursor 5 being displayed on a screen 4 of a monitor 3 connected with a personal computer 2 as a program executing machine. The information input device 1 can be held with one hand to operate.

As illustrated in FIGS. 2 to 4, the information input device 1 has a device body 6 including a touchpad 7, a pressure sensor 8, an acceleration sensor 9, an RF module 10 as transmitting means for transmitting a sensor signal obtained from each sensor to the personal computer 2, a light-emitting device (light source) 11 as lighting means for lighting the device body 6, a vibration motor 12 for giving the touchpad 7 a vibration knocking up the touchpad 7, a display unit 13 for displaying letter information, image information, or the like, and a control unit (CPU) 14 for controlling the respective components described above.

As illustrated in FIG. 2, the device body 6 has a nearly ovoid figure of a size easy to be held with one hand for example. The device body 6 is made of an elastic material, so that the whole of the device body 6 is soft. For example, the device body 6 is deformed when it is strongly held, and the device body 6 returns to its original shape when it is relieved from the strong holding force. Thus, the device body 6 is elastically deformable. Besides, the device body 6 is colored or colorless, transparent. When the light-emitting device 11 (e.g., a light-emitting diode or the like) incorporated in the device body 6 is turned on, the device body 6 is bright. As the material of the device body 6 usable is, e.g., a silicone rubber or the like, which has a certain measure of transparency and good flexibility.

As illustrated in FIG. 2, the touchpad 7 is provided at a position easy to be operated with a finger such as the thumb of the operator's hand holding the device body 6. The touchpad 7 can have a usual structure as used in note-type personal computers or the like. More specifically, the touchpad 7 is made up of an upper sheet provided on its lower face with a conductive material, a lower sheet provided on its upper face with a resistance material, and a pressure-sensitive conductive body sandwiched by the upper and lower sheets. The pressure-sensitive conductive body has electric conductance only where it has received a force along its thickness. When the touchpad 7 is depressed with a finger or the like, the pressure-sensitive conductive body becomes electrically conductive only at the depressed position. The electric potential at the depressed position is then input to a voltage/frequency converter through the conductive material of the upper sheet. The voltage/frequency converter then generates a pulse signal of a frequency in proportion to the electric potential. The beats of the pulse signal are counted with a counter to output X-coordinate data indicating the X-coordinate value of the depressed position. After switching, the electric potential at the depressed position is likewise input to the voltage/frequency converter and converted there into a frequency. The beats of a pulse signal then generated by the voltage/frequency converter is counted to output Y-coordinate data. Data of the X- and Y-coordinates of the depressed position is obtained thus.

Next, some operations to the touchpad 7 will be described. To move the cursor 5, the operator lightly rubs the upper face of the touchpad 7 with his or her finger. To select an object, the operator moves the cursor 5 onto the object and then taps once or depresses the upper face of the touchpad 7 with the finger. To select and move an object, the operator moves the cursor 5 onto the object, taps twice the touchpad 7, and then moves the finger with putting it on the touchpad 7. For double click, the operator moves the cursor 5 onto an object and then taps twice the touchpad 7.

In the above example, the operator taps once the touchpad 7 for merely selecting an object, and taps twice the touchpad 7 for selecting and moving the object. But, the present invention is not limited to this manner. In another example, the operator may tap twice the touchpad 7 for merely selecting an object. Besides, for selecting and moving an object, the operator may tap once the touchpad 7 and then move the finger with putting it on the touchpad 7.

As illustrated in FIGS. 3 and 4, the pressure sensor 8 is incorporated in the device body 6. The pressure sensor 8 functions as a so-called determination button, which outputs, to the control unit 14, a determination signal for determining the operation contents that have been input by operating the touchpad 7. According to a control program for the control unit 14, the output signal of the pressure sensor 8 has been decided to be used as such a determination signal. Consequently, the sensor signal output from the pressure sensor 8 to the control unit 14 is used as a determination signal for determining the operation contents input by operating the touchpad 7. The pressure sensor 8 is provided within the device body 6 on the side opposite to the side where the touchpad 7 is provided. The side of the device body 6 where the pressure sensor 8 is provided is held in the palm of the operator's hand. Therefore, the operator can make the pressure sensor 8 output a determination signal, by strongly holding the device body 6 in the palm.

Alternatively, the control program for the control unit 14 may decide the output signal of the pressure sensor 8 to be used as any other signal than such a determination signal, for example, a canceling signal.

As illustrated in FIGS. 3 and 4, the acceleration sensor 9 is also incorporated in the device body 6. The acceleration sensor 9 functions as a so-called cancel button, which gives its output signal to the control unit 14 for canceling the operation contents that have been input in the information input device 1. The control program for the control unit 14 has decided the output signal of the acceleration sensor 9 to be used as such a canceling signal. Consequently, the sensor signal output from the acceleration sensor 9 to the control unit 14 is used as a canceling signal for canceling the operation contents that have been input in the information input device 1. To cancel the operation contents that have been input in the information input device 1, i.e., the items or the like that have been selected with the touchpad 7 (for example, all selection cancel), the operator rapidly shakes the device body 6 from a stationary state, as illustrated in FIG. 5.

As illustrated in FIGS. 3 and 4, the RF module 10 is also incorporated in the device body 6. The RF module 10 is sensor signal transmitting means for transmitting each sensor signal of the touchpad 7, the pressure sensor 8, and the acceleration sensor 9 to the personal computer 2. For example, the RF module 10 comprises wireless communication means including a battery pack and a Bluetooth module, which communicates with a Bluetooth module 15 incorporated in the personal computer 2 as illustrated in FIG. 1. Since this embodiment uses such a Bluetooth system, which affords non-directional radio communication, the information input device 1 and the personal computer 2 can have a communication with each other even if a physical solid is in between them.

As illustrated in FIGS. 3 and 4, the light-emitting device 11 is also incorporated in the device body 6. The light-emitting device 11 emits a light, e.g., when the operator touches the touchpad 7, or strongly holds the device body 6 to turn on the pressure sensor 8 that functions as a determination button. As the light-emitting device 11 usable is, e.g., an LED or the like. Alternatively, the light-emitting device 11 may comprise LEDs for different colors. In this case, for example, light-emitting device 11 may emit a red light when the pressure sensor 8 functions, and emit a blue light when the acceleration sensor 9 functions. This may enhance the visual effect of the information input device 1.

In a further modification, the light-emitting device 11 may comprise elements having different light-emitting mechanisms, which operate in accordance with the respective sensor signals of the touchpad 7, the pressure sensor 8, and the acceleration sensor 9. For example, the sensor signal of the touchpad 7 may cause the light-emitting device 11 to emit a light from an LED, and the sensor signal of the acceleration sensor 9 may cause the light-emitting device 11 to emit a light by electroluminescence.

As illustrated in FIGS. 3 and 4, the vibration motor 12 is also incorporated in the device body 6. The vibration motor 12 operates to knock up the touchpad 7 at predetermined timings when the operator is rubbing the touchpad 7 with his or her finger. More specifically, when the operator rubs the touchpad 7 with his or her finger, the vibration motor 12 causes the operator to sense, through the finger, how long the cursor 5 has moved. For this purpose, every time when the operator moves the finger by a certain distance, the vibration motor 12 operates to give the touchpad 7 a vibration knocking up the touchpad 7. Since such a vibration is transmitted to the fingertip every time when the operator moves the finger by a certain distance, the operator can know how long he or she has moved the cursor 5.

As shown in FIGS. 2 to 4, the display unit 13 is provided in the upper face of the device body 6, where the touchpad 7 is also provided. The display unit 13 displays thereon, e.g., a mode indicating that the operator is operating an application program or the like being executed in the personal computer 2. The display unit 13 comprises a liquid crystal display device for example, on which letter information, image information, or the like, can be displayed. Besides, if the information input device 1 of this embodiment is used for operating a television or radio receiver, then the display unit 13 displays thereon a mode indicating that the operator is operating the television or radio receiver.

The control unit 14 controls the touchpad 7, the pressure sensor 8, the acceleration sensor 9, the RF module 10, the light-emitting device 11, the vibration motor 12, etc., as illustrated in FIG. 4.

Operation Manner of Information Input Device

Next will be described a specific operation manner of the information input device having the above-described construction. In the below-described example, a web browser window in an optional site on the Internet is operated with the information input device of this embodiment.

Figure 6:
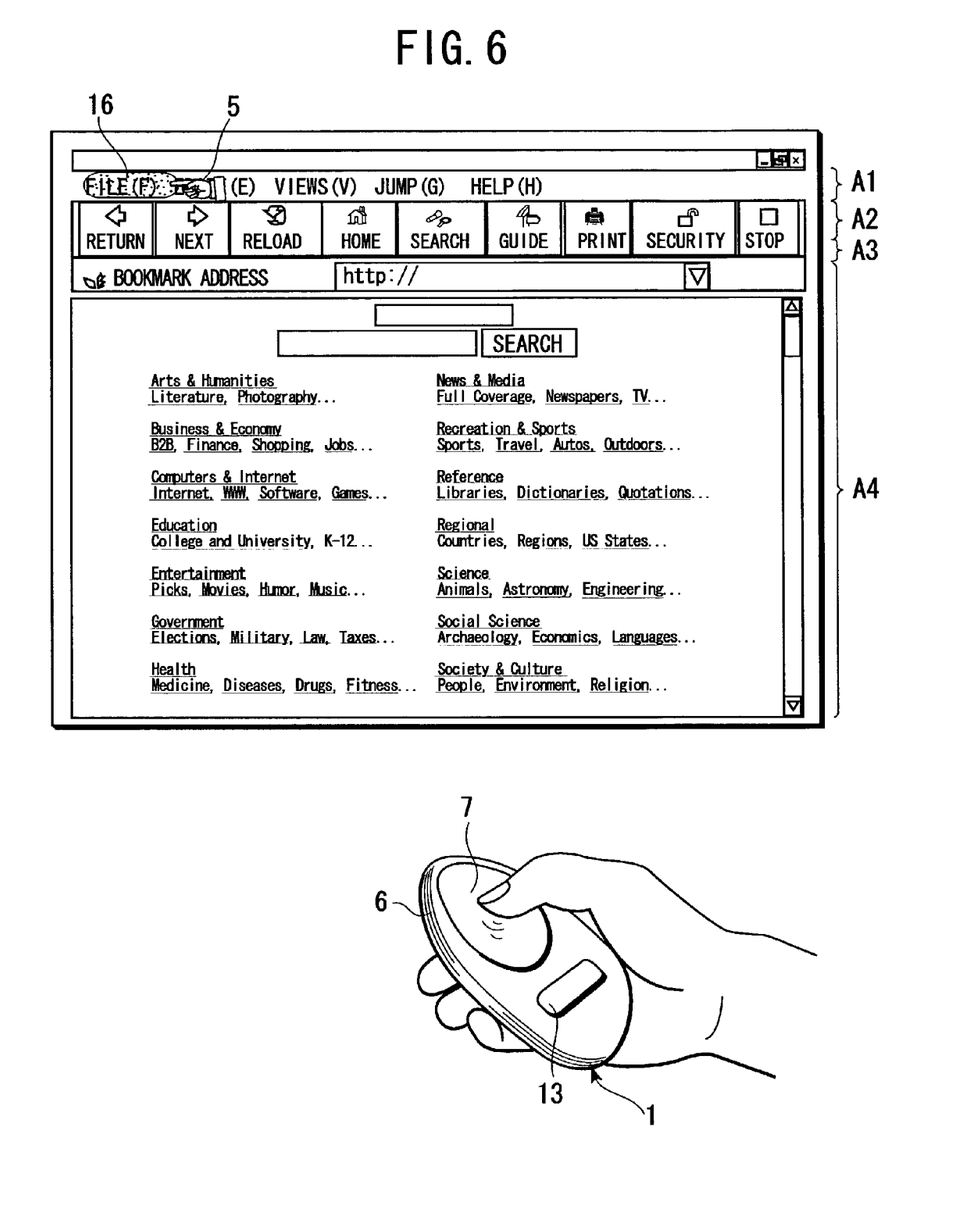
FIG. 6 illustrates a state that the touchpad on the information input device is operated with the thumb of an operator's hand to select "File" button in a browser window.
Figure 7:
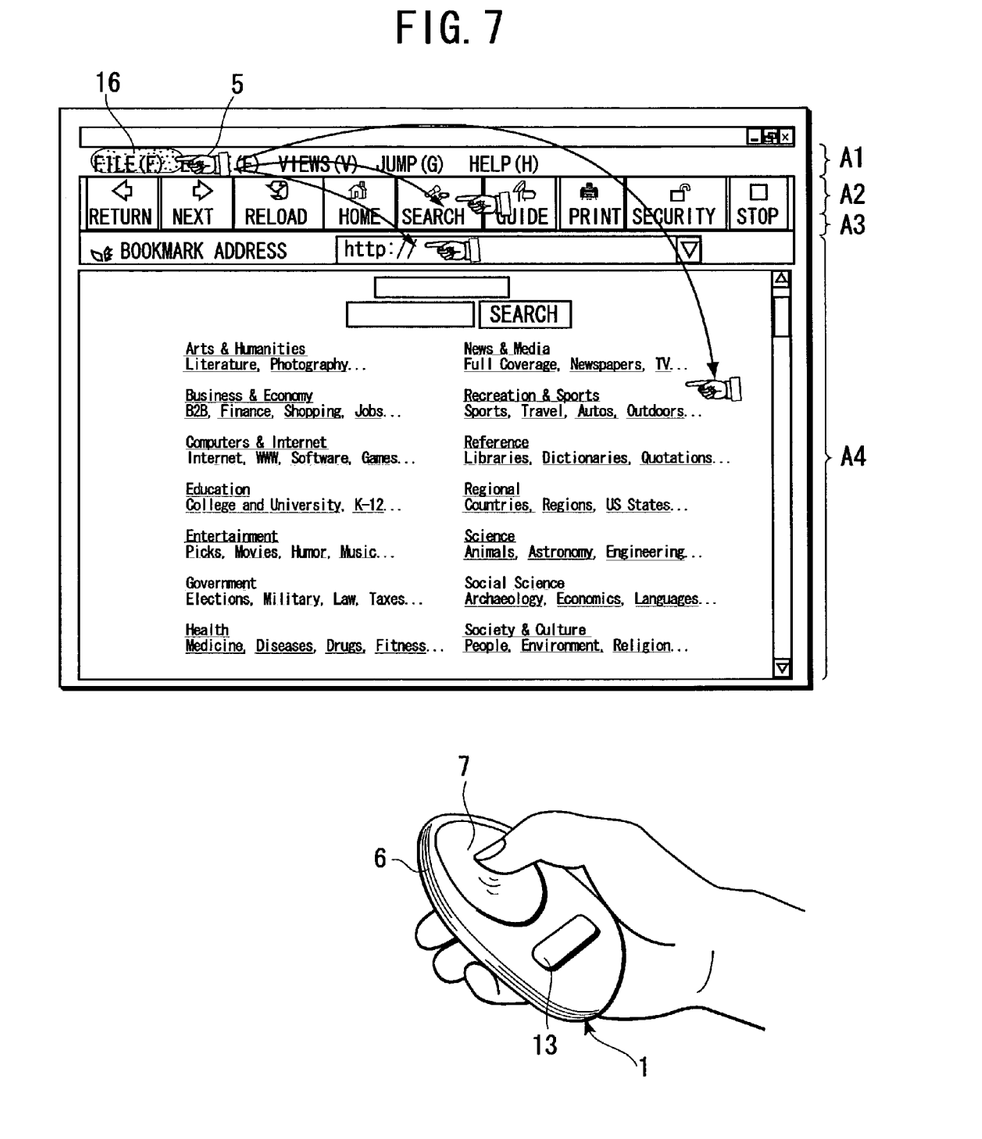
FIG. 7 illustrates a state that the touchpad is operated with the thumb to select some areas in the browser window.

For example, the browser window illustrated in FIG. 6 comprises a first area A1, where a menu bar is displayed, a second area A2, a third area A3, and a display area A4 for displaying therein letter information, image information, etc., on the site. In this browser window, as illustrated in FIG. 6, when the operator intends to select "File" button 16 on the menu bar of the first area A1, the operator, who is holding the information input device 1 with his or her hand, rubs the touchpad 7 on the information input device 1 with the thumb of the hand so as to move the cursor 5 onto the "File" button 16. The operator then taps once the touchpad 7 with the thumb to select the "File" button 16. Also, as illustrated in FIG. 7, by adequately rubbing the touchpad 7 with the thumb to move the cursor 5, the operator can select a desired button in the second or third area A2 or A3, or a desired link (another site address functionally incorporated in the web page) in the display area A4.

In this case, the display unit 13 on the information input device 1 is displaying thereon a mode indicating that the operator is operating the web browser. By viewing the mode displayed on the display unit 13, the operator of the information input device 1 can know through his or her eyes what he or she is operating.

Figure 8:
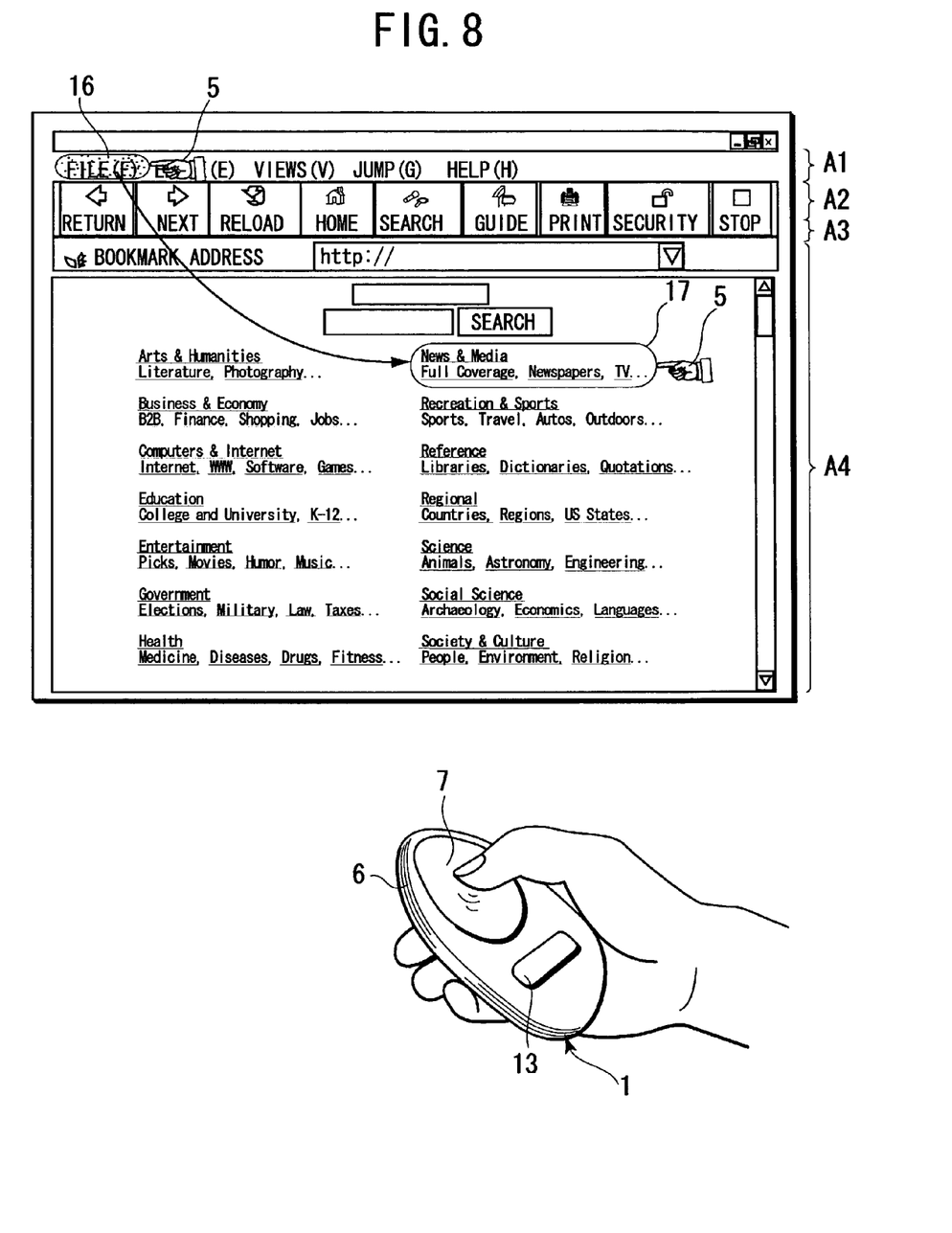
FIG. 8 illustrates a state that the cursor is moved from "File" button to an optional link in the display area of the browser window.

To move the cursor 5 from the "File" button 16 onto an optional link 17 in the display area A4 as illustrated in FIG. 8, the operator rubs the touchpad 7 with the thumb so as to move the cursor 5 onto the optional link 17. When the cursor 5 is on the optional link 17, the operator taps once the touchpad 7 with the thumb (or strongly depresses the touchpad 7 with the thumb) to select the link 17. To determine the selection, the operator then strongly holds the device body 6 of the information input device 1. By thus strongly holding the device body 6, the pressure sensor 8 that functions as a determination button sends a determination signal for determining the selection of the link 17 to the RF module 10 of the personal computer 2.

Figure 9:
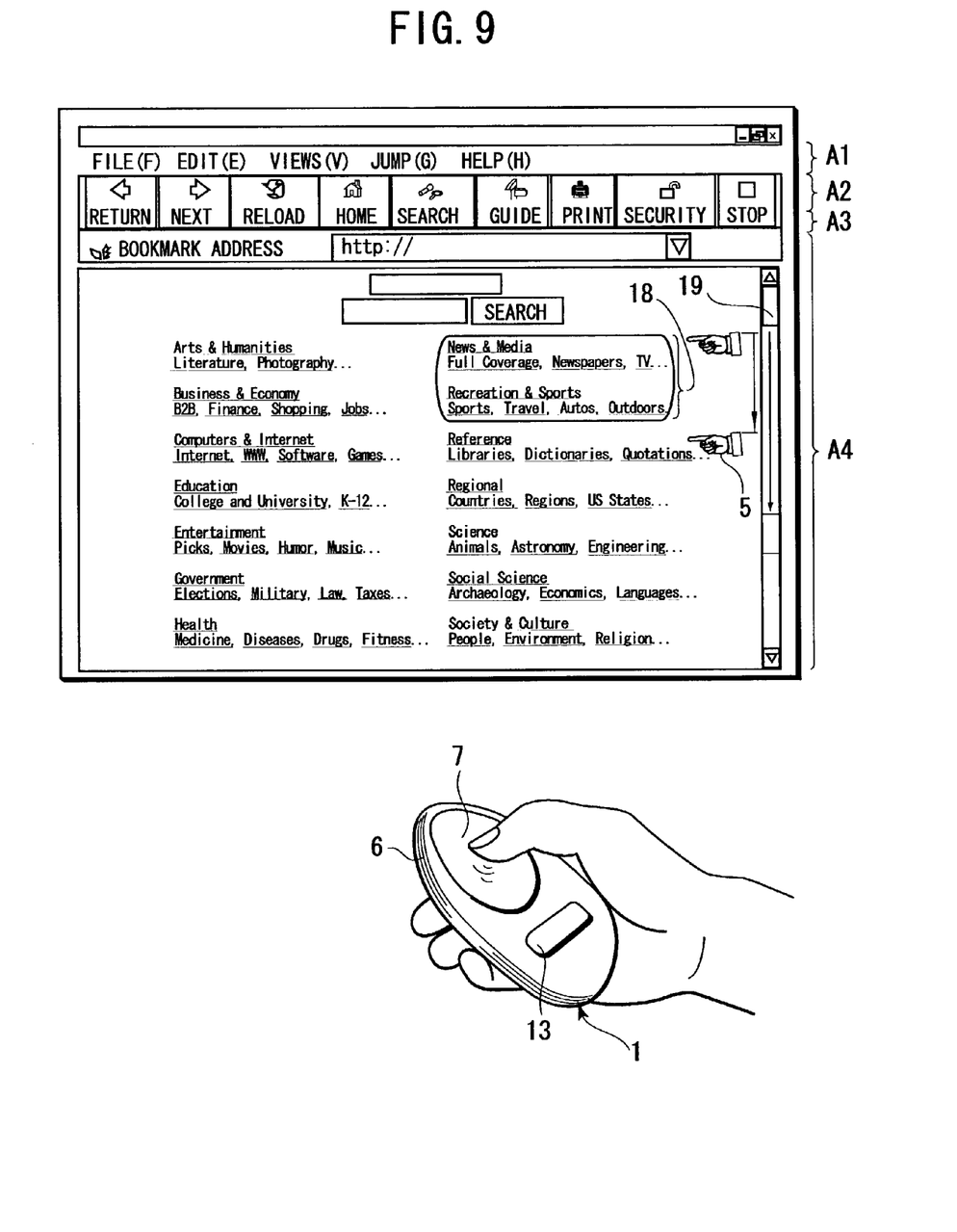
FIG. 9 illustrates a state that plural links are selected in the display area.

To select plural links in the display area A4, as illustrated in FIG. 9, the operator rubs the touchpad 7 with the thumb so as to move the cursor 5 onto desired plural links 18 in order, and the operator taps the touchpad 7 with the thumb when the cursor 5 is on each link 18. At this time, a knocking-up vibration is transmitted from the vibration motor 12 to the thumb of the operator, and thereby the operator of the information input device 1 can have a feel indicating that he or she could surely perform the selecting operation. To move a scroll bar 19, the operator rubs the touchpad 7 with the thumb so as to move the cursor 5 onto the scroll bar 19, taps twice the touchpad 7 to hold the scroll bar 19, and then moves the thumb with putting it on the touchpad 7. If the operator has selected a wrong range, he or she can cancel the wrong selection by rapidly shaking the device body 6 from a stationary state, as illustrated in FIG. 5.

Figure 10:
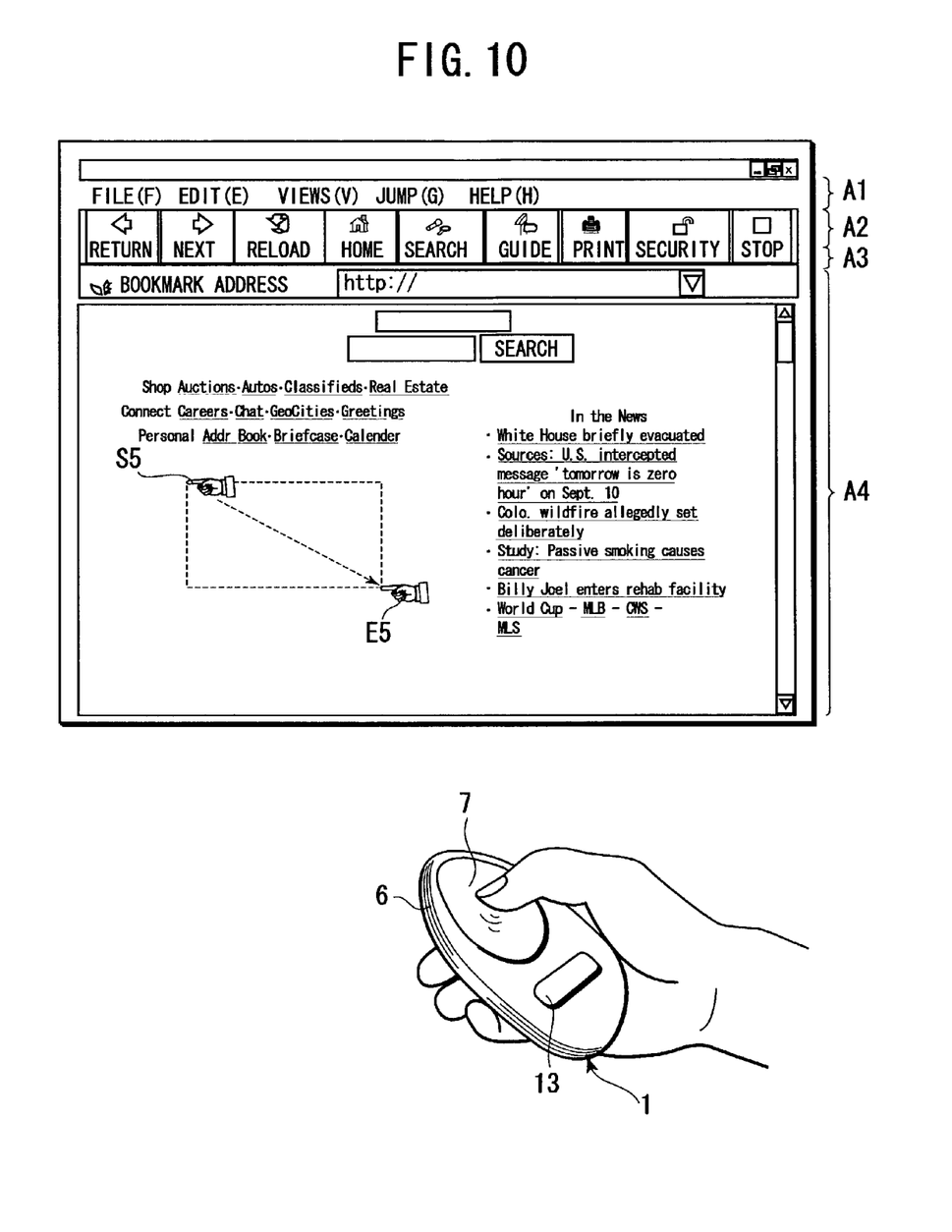
FIG. 10 illustrates a state that a desired range is selected in the display area.
Figure 11:
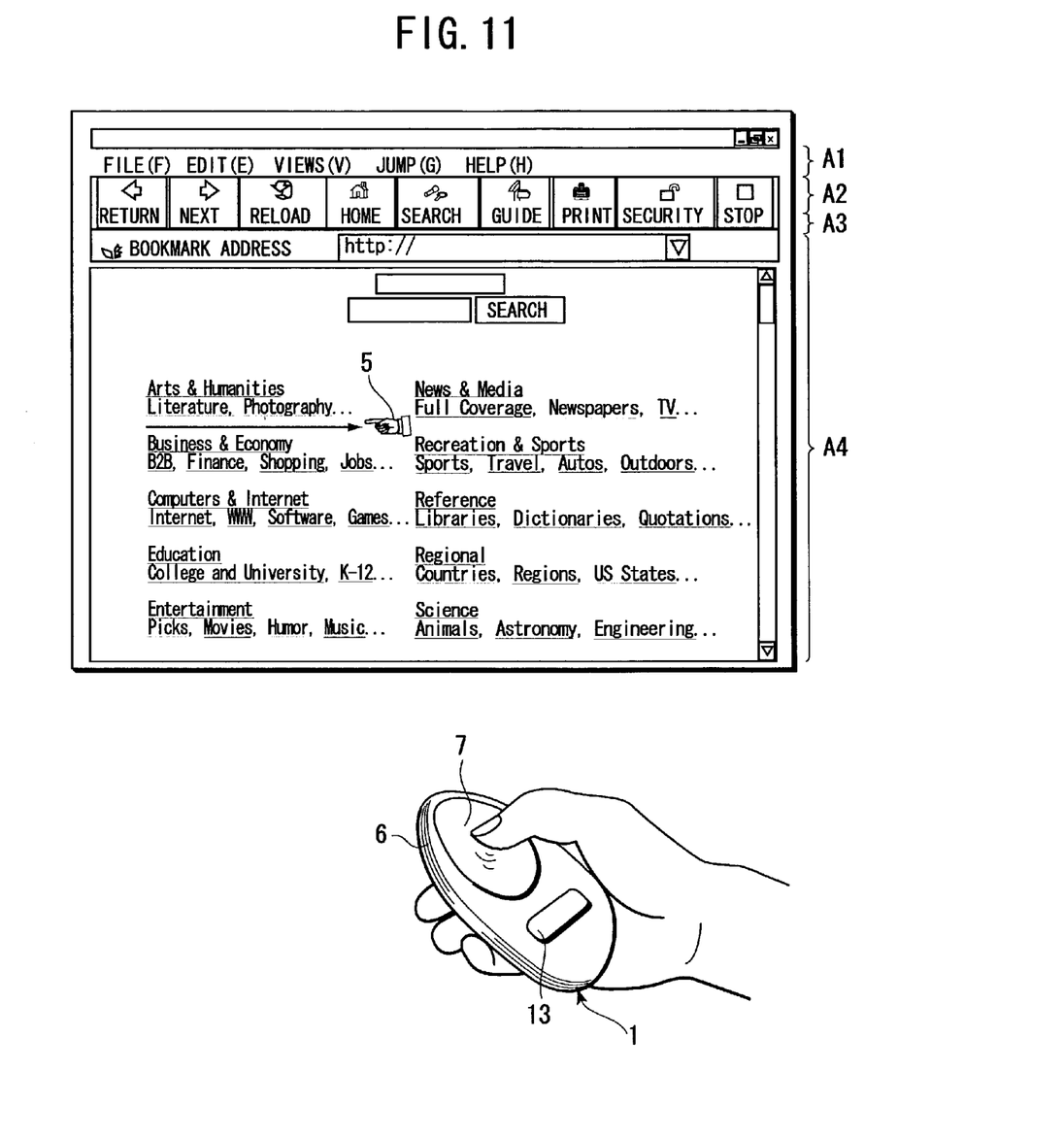
FIG. 11 illustrates a state that the selected range is displayed in an enlarged form.

To select a desired range in the display area A4 by enclosing the range, as illustrated in FIG. 10, the operator moves the cursor 5 to an adequate position and then taps twice the touchpad 7 with the thumb to determine a start point S5 for enclosing the range. The operator then moves the thumb on the touchpad 7 so as to move the cursor 5 onto an end point E5 for enclosing the range. When the cursor 5 is on the end point E5, the operator taps once the touchpad 7 with the thumb to select the enclosed range. In this state, the operator strongly holds the device body 6 of the information input device 1. The pressure sensor 8 then sends a determination signal for determining the selected range to the RF module 10 of the personal computer 2. As a result, in the display area A4, the contents of the selected range are displayed in an enlarged form, as illustrated in FIG. 11.

According to this embodiment, differently from any conventional information input device such as a mouse, which must be moved on and along a desk face or the like and a button of which is single- or double-clicked there, the information input device 1 of this embodiment can be held easily with one hand and operated in any posture of the operator. This brings about no restriction of place to operate. Besides, with the information input device 1 of this embodiment, the operator can instruct, through wireless communication, the personal computer 2 to, e.g., move the cursor 5. Therefore, the operator can operate the information input device 1 in a remote place from the personal computer 2. Besides, since the information input device 1 of this embodiment can be operated with one hand, the operator can operate the information input device 1 not only on a chair but also in a lying posture.

Besides, when the operator rubs the touchpad 7 with his or her finger, taps the touchpad 7 with the finger, or strongly depresses the touchpad 7 with the finger, a knocking-up vibration is transmitted to the finger. Therefore, by such a force feedback function, the operator can have a feel indicating that he or she could surely perform the operation.

Besides, since the device body 6 is provided with the display unit 13, the operator can clearly know what he or she is operating now.

Other Embodiments

The information input device 1 according to a specific embodiment of the present invention has been described. However, the present invention is not limited to the above embodiment, and various alterations, changes, and modifications can be made therein.

For example, the information input device 1 of the present invention is usable also for operating a television receiver, a video recorder, or the like. In addition, the information input device 1 is usable also as a controller of a video game machine.

Besides, in the above embodiment, the device body 6 is made of an elastic, flexible material. But, the device body 6 may be made of a hard plastic or the like.

Figure 12:
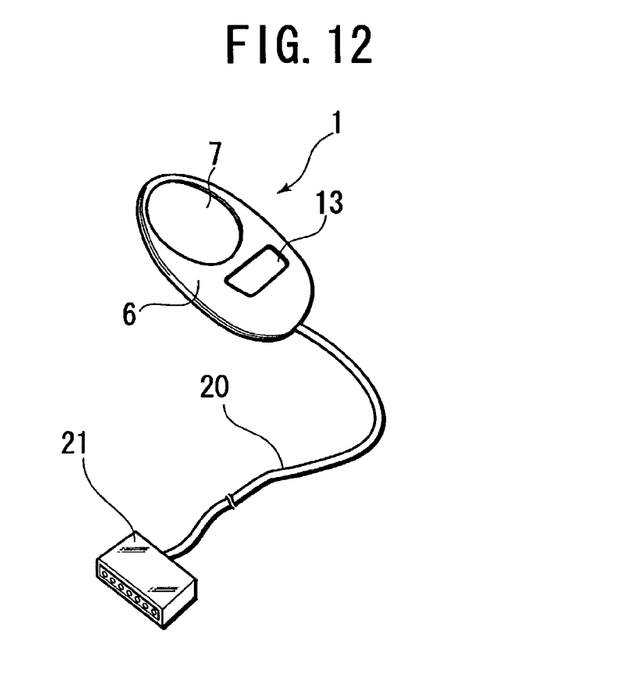
FIG. 12 is a perspective view of an information input device according to the present invention, which includes communication means within its device body and transmits/receives signals to/from a personal computer through wire in a state that a connector provided at the distal end of a cable connected to the communication means is connected to the personal computer.

Besides, in the above embodiment, the device body 6 is provided therein with the RF module 10 for wireless communication. Alternatively, the information input device 1 of the present invention may be provided with means for wired communication. For example, in the information input device 1 illustrated in FIG. 12, the device body 6 is provided therein with communication means, and a cable 20 connected to the communication means extends out of the device body 6. The cable 20 is provided at its distal end with a connector 21. The connector 21 is connected to the personal computer 2 for making wired communication between the information input device 1 and the personal computer 2.

Figure 13:
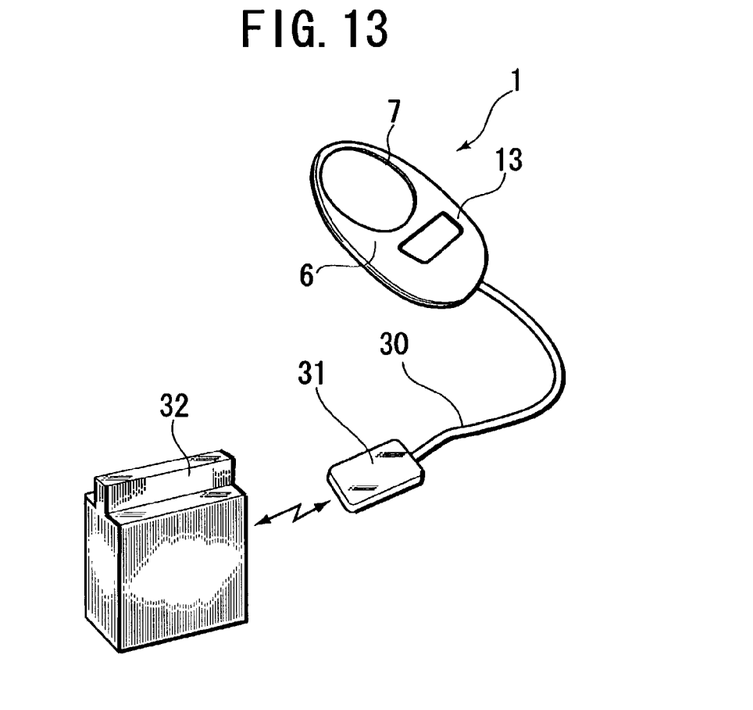
FIG. 13 is a perspective view of an information input device according to the present invention, which is provided at the distal end of a cable with an RF module and transmits/receives signals to/from a personal computer through the RF module by wireless.

Besides, in the information input device 1 illustrated in FIG. 13, a cable 30 extending out of the device body 6 is provided at its distal end with a Bluetooth module 31 in which a battery pack is incorporated. The Bluetooth module 31 communicates by wireless with a Bluetooth module 32 of a program executing machine such as the personal computer 2 for making wireless communication between the information input device 1 and the program executing machine.

Besides, in the above embodiment, the device body 6 of the information input device 1 has a substantially elliptic figure, i.e., an ovoid figure in its plan view. However, according to the present invention usable is a device body of any shape as illustrated in FIGS. 14 to 17 for example. In FIGS. 14 to 17, touchpads and display units are denoted by the same reference numerals as those in the above embodiment.

Figure 14:
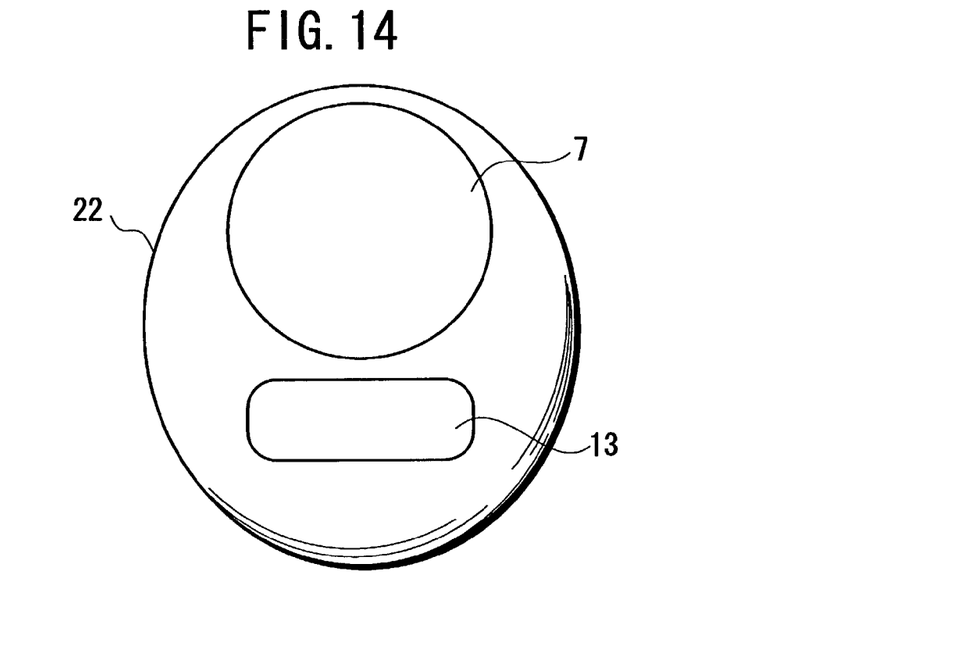
FIG. 14 is a plan view of an information input device according to the present invention, the body of which has a substantially circular figure in the plan view.
Figure 15:
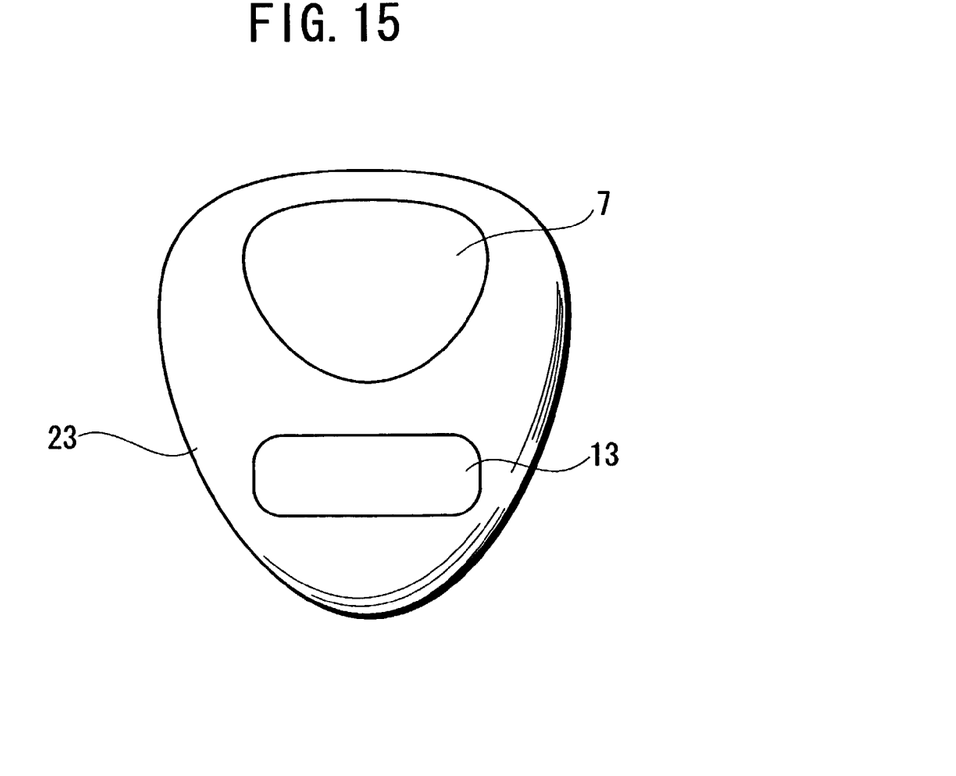
FIG. 15 is a plan view of an information input device according to the present invention, the body of which has an inverted-triangular figure with rounded corners.
Figure 16:
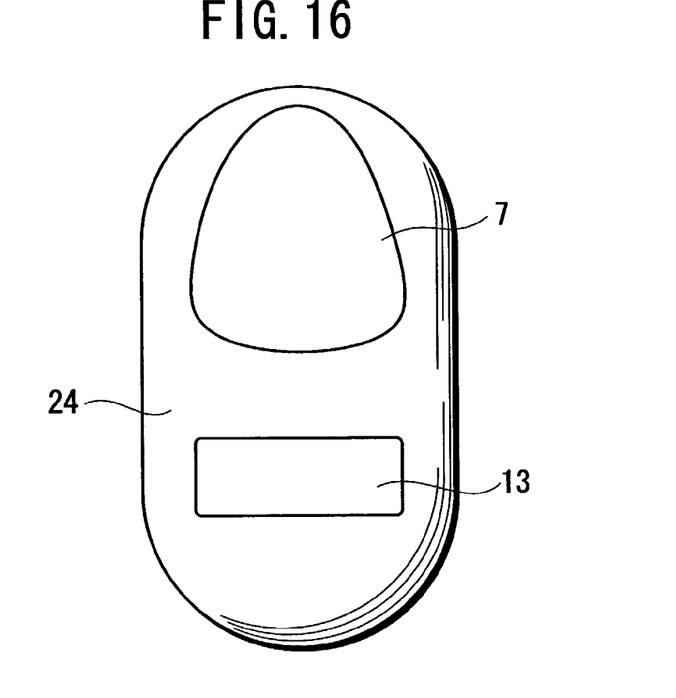
FIG. 16 is a plan view of an information input device according to the present invention, the body of which has a longitudinally-elongated circular figure.
Figure 17:
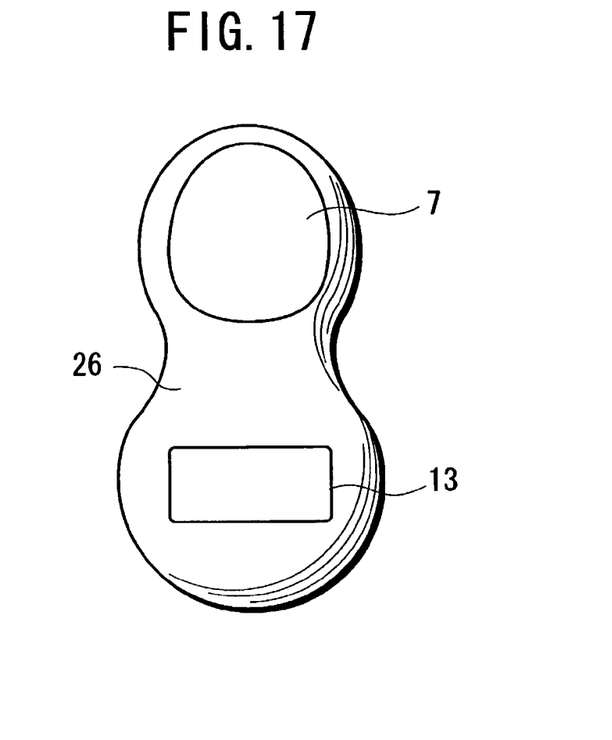
FIG. 17 is a plan view of an information input device according to the present invention, the body of which has a gourd figure.

FIG. 14 illustrates an information input device the body 22 of which has a substantially circular figure in its plan view. FIG. 15 illustrates an information input device the body 23 of which has an inverted-triangular figure with rounded corners. FIG. 16 illustrates an information input device the body 24 of which has a longitudinally-elongated circular figure. FIG. 17 illustrates an information input device the body 26 of which has a gourd figure.

What is claimed is:

1. A hand-held information input device for giving input instructions to a program executing machine, comprising:
    a device body having a substantially elliptical shape of a size easily held with one hand and made of a substantially elastic material having transparency and flexibility;
    a vibrator provided in the device body;
    a touch sensor provided on a face of the device body to sense a first predetermined operation of a touch of a human finger and the touched position;
    a pressure sensor provided in the device body to sense a second predetermined operation independently from the touch sensor;
    an acceleration sensor provided in the device body to sense a third predetermined operation independently from the touch sensor and the pressure sensor;
    a sensor signal transmitter that transmits a sensor signal of the touch sensor, the pressure sensor, and the acceleration sensor to the program executing machine; and
    a control unit for controlling said vibrator, said touch sensor, said pressure sensor, said acceleration sensor, and said sensor signal transmitter.

2. The device according to claim 1, wherein the vibrator vibrates at least the touch sensor.

3. The hand-held information input device according to claim 1, further comprising:
    a light-emitting device provided in the device body for lighting the device body,
    wherein the control unit further controls the light-emitting device.

4. The hand-held information input device according to claim 1, further comprising:
    a display unit provided on the face of the device body for displaying information,
    wherein the control unit further controls the display unit.

5. A hand-held information input device for giving input instructions to a program executing machine, comprising:
    a device body having a substantially elliptical shape of a size easily held with one hand and made of a substantially elastic material having transparency and flexibility;
    vibrating means for vibrating provided in the device body;
    touch sensing means for sensing a first predetermined operation of a touch of a human finger and the touched position, the first sensing means provided on a face of the device body,
    pressure sensing means for sensing a second predetermined operation of pressure on the device body independently from the touch sensing means, the pressure sensing means provided in the device body;
    acceleration sensing means for sensing a third predetermined operation of acceleration of the device body independently from the touch sensing means and the pressure sensing means, the acceleration sensing means provided in the device body;

transmitting means for transmitting a sensor signal of the touch sensing means, the pressure sensing means, and the acceleration sensing means to the program executing machine; and control means for controlling said vibrating means, said touch sensing means, said pressure sensing means, said acceleration sensing means, and said transmitting means.

6. The device according to claim 5, wherein the vibrating means vibrates at least the touch sensing means.

7. The hand-held information input device according to claim 5, further comprising:

light-emitting means for lighting the device body, The light-emitting means provided in the device body, wherein the control means further controls the light-emitting means.

8. The hand-held information input device according to claim 5, further comprising:

display means for displaying information, the display means provided on the face of the device body, wherein the control means further controls the display means.

* * * * *